(12) United States Patent
Swan et al.

(10) Patent No.: US 9,930,831 B2
(45) Date of Patent: Apr. 3, 2018

(54) MOWER DECK GRASS COLLECTOR CHUTE

(71) Applicant: Deere & Company, Moline, IL (US)

(72) Inventors: Allen F. Swan, Beaver Dam, WI (US); Gary D. Hohnl, Slinger, WI (US)

(73) Assignee: Deere & Company, Moline, IL (US)

( * ) Notice: Subject to any disclaimer, the term of this patent is extended or adjusted under 35 U.S.C. 154(b) by 68 days.

(21) Appl. No.: 14/843,903

(22) Filed: Sep. 2, 2015

(65) Prior Publication Data

US 2017/0055442 A1     Mar. 2, 2017

(51) Int. Cl.
*A01D 34/71*     (2006.01)

(52) U.S. Cl.
CPC .................................... *A01D 34/71* (2013.01)

(58) Field of Classification Search
CPC .... A01D 34/71; A01D 34/667; A01D 43/073; A01D 2101/00; A01D 34/81; A01D 43/063
USPC .......................................................... 56/202
See application file for complete search history.

(56) References Cited

U.S. PATENT DOCUMENTS

| | | | | |
|---|---|---|---|---|
| 2,807,126 A * | 9/1957 | Bennett | ................ | A01D 43/063 37/243 |
| 2,973,614 A * | 3/1961 | Horner | ................... | A01D 34/63 56/202 |
| 3,118,267 A * | 1/1964 | Shaw | ..................... | A01D 34/71 56/17.5 |
| 3,132,457 A * | 5/1964 | Slemmons | ........... | A01D 43/063 55/378 |
| 3,646,739 A * | 3/1972 | Dahl | .................... | A01D 34/828 56/320.1 |
| 3,646,740 A * | 3/1972 | Grimes | .................. | A01D 75/20 56/320.2 |
| 3,750,378 A * | 8/1973 | Thorud | .............. | A01D 43/0631 56/10.5 |
| 3,805,498 A * | 4/1974 | Armstrong | ............. | A01D 34/71 56/17.5 |
| RE29,139 E * | 2/1977 | Messner | ................ | A01D 42/00 15/328 |
| 4,106,272 A * | 8/1978 | Peterson | .............. | A01D 43/063 56/13.4 |

(Continued)

FOREIGN PATENT DOCUMENTS

| | | | |
|---|---|---|---|
| DE | 3523651 A1 | 1/1986 | |
| GB | 849915 A * | 9/1960 | ............. A01D 34/71 |

(Continued)

OTHER PUBLICATIONS

Search Report in counterpart application No. GB1614953.6, dated Feb. 24, 2017 (3 pages).

(Continued)

*Primary Examiner* — Thomas B Will
*Assistant Examiner* — Joan D Misa

(57) ABSTRACT

A mower deck grass collector chute includes an inlet connected to a side discharge opening in a mower deck, and a tubular portion that extends upwardly and rearwardly to an outlet. The inlet is positioned under the horizontal deck surface and has a curved surface extending forwardly under the mower deck around the perimeter of a first cutting chamber. A forward end of the curved surface may be in front of the first cutting chamber.

15 Claims, 6 Drawing Sheets

(56) References Cited

U.S. PATENT DOCUMENTS

| | | | |
|---|---|---|---|
| 4,158,279 A * | 6/1979 | Jackson | A01D 43/07 56/16.6 |
| 4,168,600 A | 9/1979 | Klug et al. | |
| 4,245,455 A * | 1/1981 | Martin | A01D 34/695 56/12.8 |
| 4,532,755 A * | 8/1985 | Schemelin | A01D 43/063 56/16.6 |
| 4,614,080 A | 9/1986 | Hoepfner et al. | |
| 4,693,063 A * | 9/1987 | Hoepfner | A01D 43/077 56/13.3 |
| 4,726,178 A * | 2/1988 | Mallaney | A01D 34/82 56/202 |
| 4,856,265 A | 8/1989 | Wolf | |
| 4,926,624 A | 5/1990 | Murakawa et al. | |
| 5,398,491 A | 3/1995 | Hartley | |
| 5,511,369 A | 4/1996 | Cerminara, Jr. | |
| 5,845,473 A | 12/1998 | Hopkins et al. | |
| 6,360,517 B1 | 3/2002 | Ishimori et al. | |
| 7,065,946 B2 * | 6/2006 | Boeck | A01D 43/08 56/320.1 |
| 7,574,852 B1 | 8/2009 | Loxerkamp et al. | |
| 9,226,445 B2 * | 1/2016 | Dehart | A01D 43/06 |
| 2010/0008363 A1 | 4/2010 | Ahlund et al. | |
| 2015/0230402 A1 * | 8/2015 | Grande | A01D 34/4167 30/124 |

FOREIGN PATENT DOCUMENTS

| | | | | |
|---|---|---|---|---|
| GB | 1000650 A | * | 8/1965 | A01D 34/71 |
| GB | 2048041 A | | 12/1980 | |

OTHER PUBLICATIONS

Search Report in counterpart application No. DE102016216224.1, dated Mar. 24, 2017 (8 pages).

* cited by examiner

MOWER DECK GRASS COLLECTOR CHUTE

FIELD OF THE INVENTION

This invention relates generally to rotary mower decks carried by tractors or other grass mowing machines. More specifically, the invention relates to a mower deck grass collector chute for a mower deck.

BACKGROUND OF THE INVENTION

Tractors, utility vehicles or zero turn mowers used for lawn care may carry a mower deck covering two or more rotary cutting blades on the lower ends of vertically oriented spindles. A mower deck may be attached to the vehicle with mechanical linkages that allow the deck to be carried at a range of different cutting heights, and raised or lowered between each height. The blade spindles may be rotated by one or more belts and pulleys above the top surface of the deck, which may be driven by a belt and/or power take off shaft connected to the engine or other power source.

Grass collectors or bagging attachments are available for collection of grass clippings from grass mowing machines. A grass collector chute may extend from the mower deck to a grass collector or bagging attachment mounted to the rear of the machine. The inlet of the collector chute may be positioned and secured over a discharge opening on the right side of the deck or at the rear of the deck. The collector chute may extend rearwardly and upwardly to its outlet which opens into the hopper or bag.

Mower deck grass collector chutes may become clogged with grass clippings during normal or heavy use. For example, wet grass and early spring grass clippings may form clumps which get stuck near the inlet of the collector chute. For example, the flow of grass clippings tends to be very heavy at the front of the chute inlet, and very light at the rear of the chute inlet. As a result, the chute may fill up with grass clippings, clippings under the deck may impair cutting performance, and clumps may be left on the ground.

A mower deck grass collector chute is needed that does not become clogged with grass clippings. A mower deck grass collector chute is needed that helps improve cutting performance and does not leave clumps on the ground. A mower deck grass collector chute is needed that provides more uniform flow to efficiently move grass clippings from the mower deck to the hopper.

SUMMARY OF THE INVENTION

A mower deck grass collector chute includes an inlet connected to an outlet by a tubular portion. The inlet is positioned under a multi-chamber mower deck and has a curved surface extending partially around a first generally circular cutting chamber under the mower deck in front of and to the right of a mower blade spindle. The curved surface of the inlet slopes upwardly from a forward end to a rearward end. The upwardly sloping curved surface promotes flow of grass clippings so the grass collector chute does not become clogged. The flow of grass clippings may be balanced between the front and rear of the chute inlet. As a result, the grass collector chute helps improve cutting performance and does not leave clumps on the ground. The grass collector chute provides more uniform flow and efficiently moves grass clippings into the hopper.

DESCRIPTION OF THE PREFERRED EMBODIMENT

Figure 1:
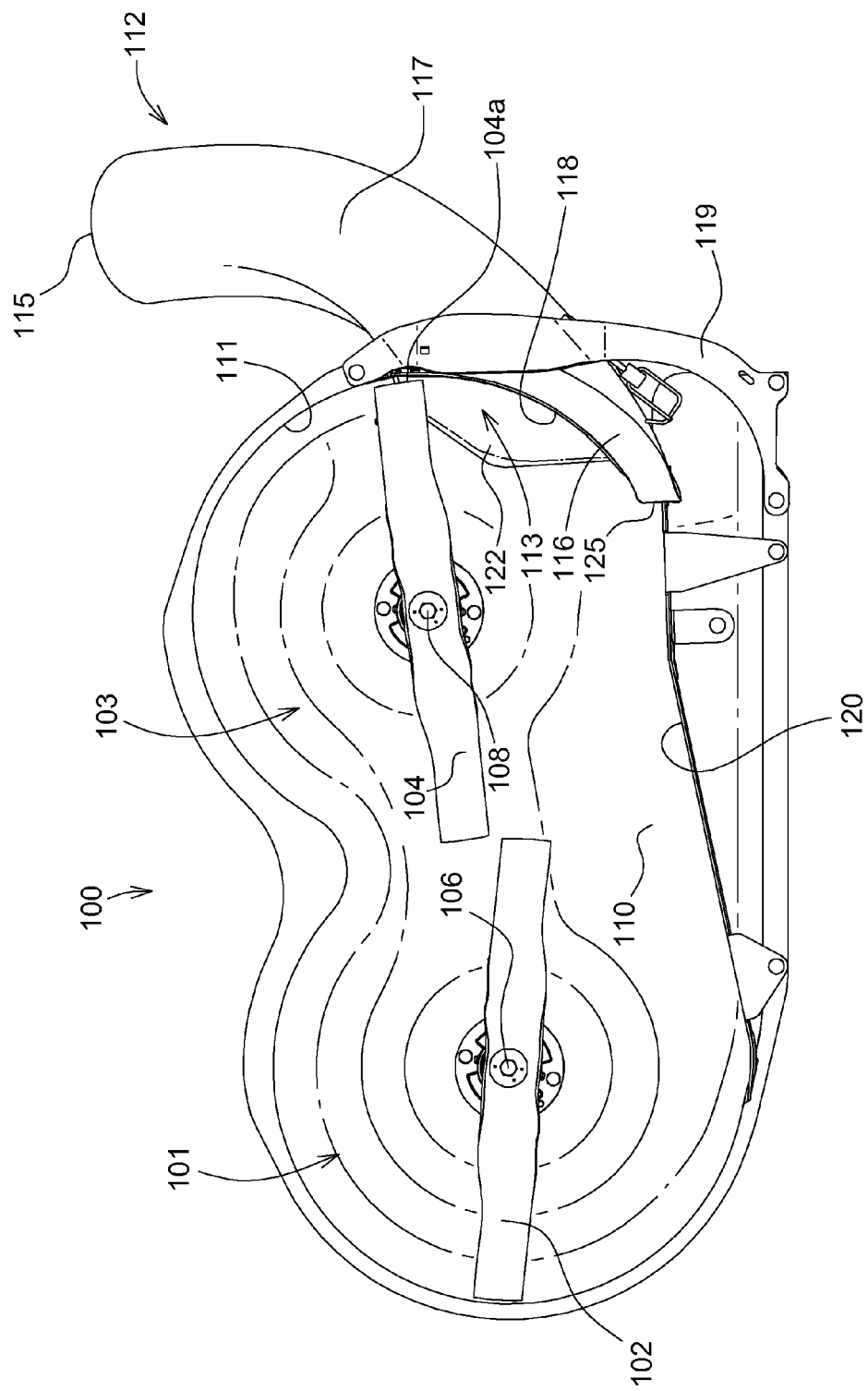
FIG. 1 is a bottom view of a mower deck with a grass collector chute attached thereto according to a first embodiment of the invention.
Figure 2:
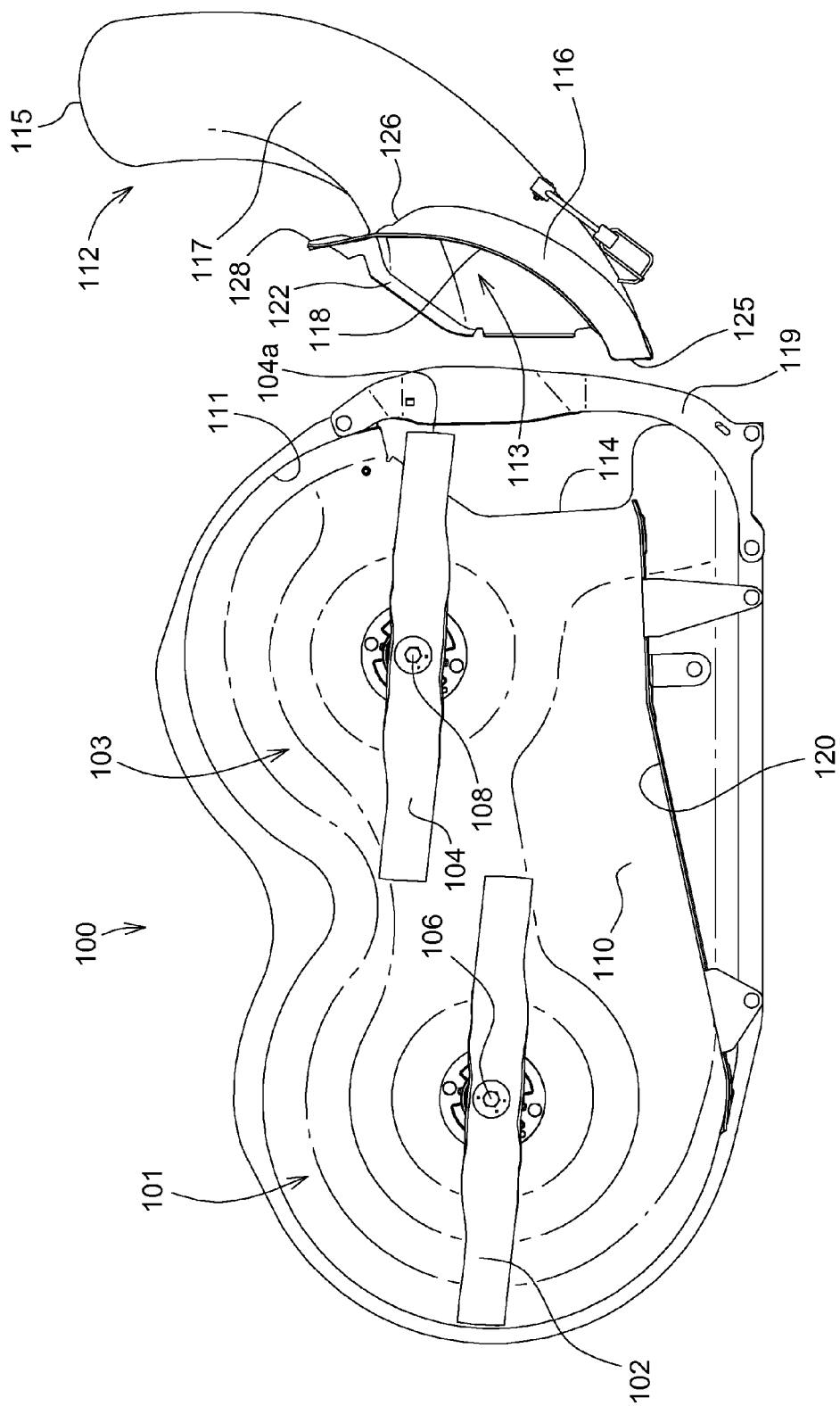
FIG. 2 is a bottom view of a mower deck with an unattached grass collector chute according to a first embodiment of the invention.
Figure 3:
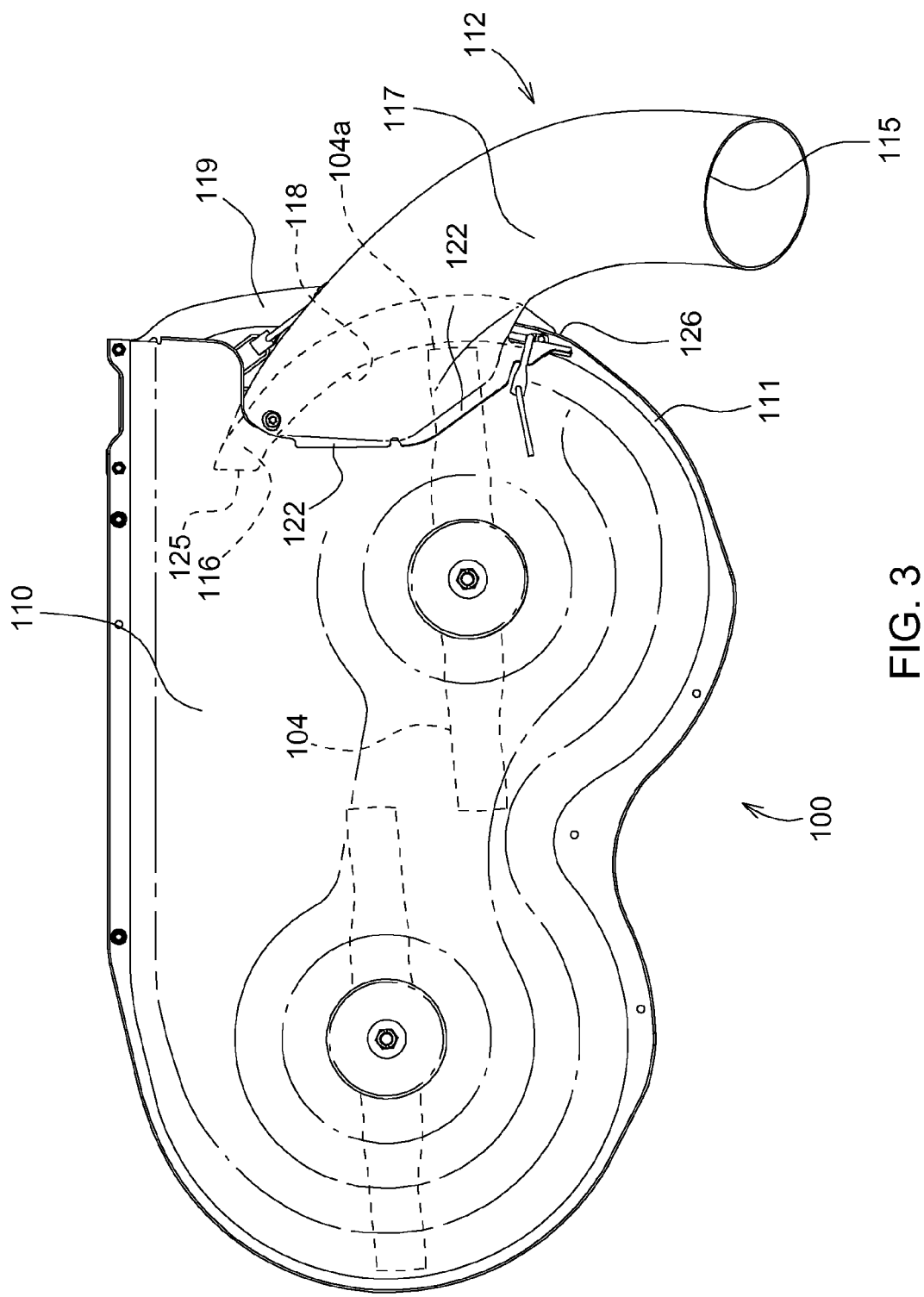
FIG. 3 is a top view of a mower deck with a grass collector chute according to a first embodiment of the invention.
Figure 4:
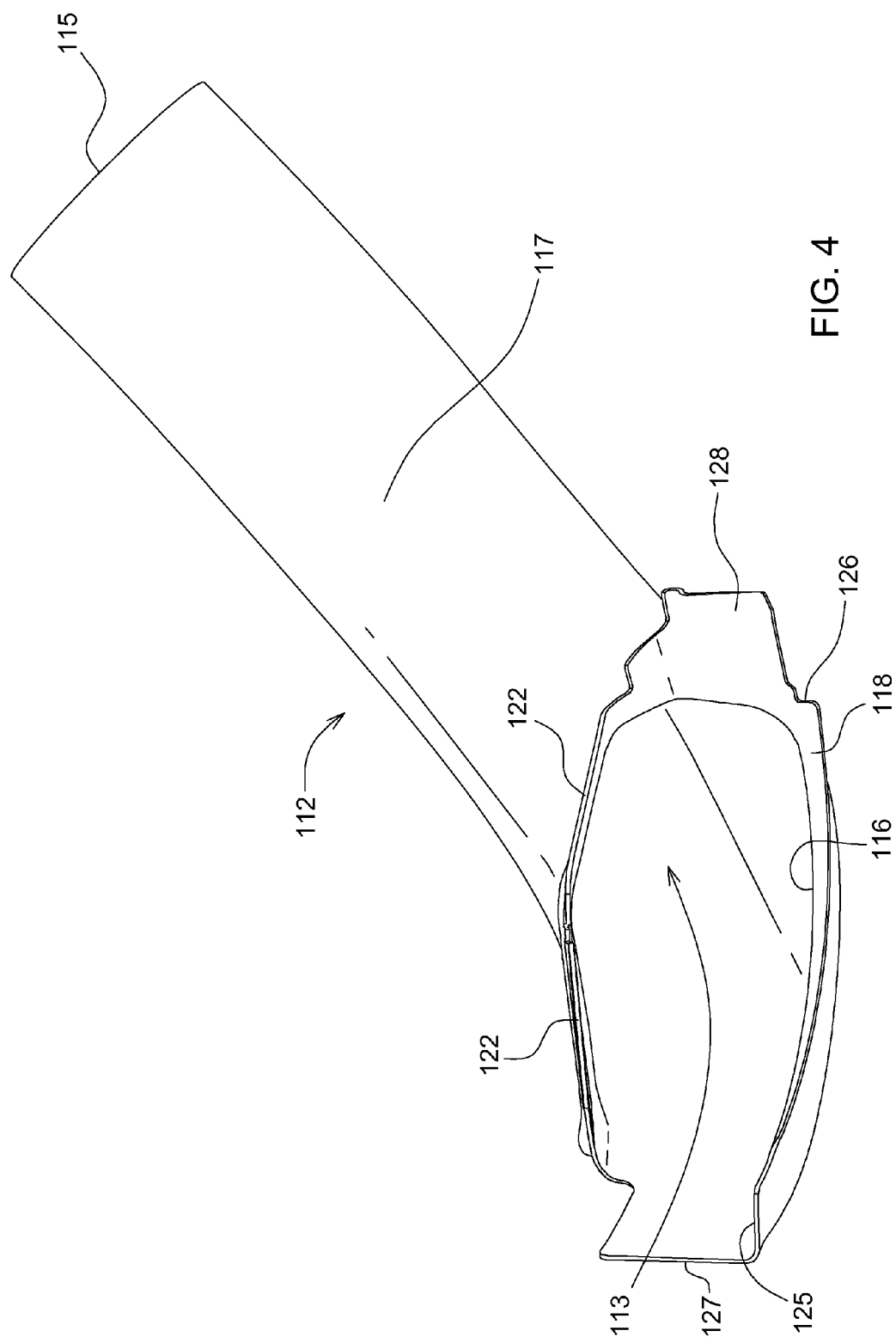
FIG. 4 is a perspective view of a mower deck grass collector chute according to a first embodiment of the invention.

As shown in FIGS. 1-6, in one embodiment, mower deck 100 may be positioned under a tractor, utility vehicle or zero turn mower, preferably between the front and rear wheels. The mower deck may have a pair of generally circular cutting chambers 101, 103, with a rotary cutting blade 102, 104 mounted in each cutting chamber on the lower end of vertically oriented blade spindles 106, 108. Alternatively, the mower deck may have three cutting chambers and three rotary cutting blades. The mower deck may have a generally horizontal surface 110 surrounded by a downwardly depending skirt 111. A belt and pulley system may transmit power from an internal combustion engine or other power source to the spindles to rotate the mower blades.

In one embodiment, mower deck 100 may have side discharge opening 114 in cutting chamber 103. Side discharge opening 114 may be through skirt 111 at the front and right side of cutting chamber 103, forwardly and to the right of spindle 108. Additionally, side discharge opening 114 may be through horizontal deck surface 112 over cutting chamber 103, forwardly and to the right of spindle 108, and above the tip of rotary mower blade 104. As a result, part of the side discharge opening may be located over a region of mower blade 104 that lifts grass clippings. Toe guard 119 may be secured to the underside of skirt 111 between the front and back of the side discharge opening below the grass collector chute.

In one embodiment, mower deck grass collector chute 112 may be a one-piece plastic member connecting the mower deck to a hopper or bag (not shown) for collection of grass clippings. The grass collector chute may have inlet 113, outlet 115, and tubular portion 117 between the inlet and outlet. The inlet 113 of the grass collector chute may be fastened to the mower deck with one or more clips or other hardware. For example, one or more flanges 122 extending from the top surface of inlet 113 may engage connectors on the horizontal deck surface adjacent side discharge opening 114. Additionally, tab 128 extending from the rearward end 126 of inlet 113 may engage skirt 111 adjacent the side discharge opening. The tubular portion of the grass collector chute may have a cross sectional area sufficient for grass clippings to flow smoothly up and rearwardly to outlet 115 where they may be discharged into a hopper or bag.

In one embodiment, mower deck grass collector chute 112 may include inlet 113 that forms a curved surface partially around cutting chamber 103. For example, inlet 113 may form segment of a circle or arc of at least about 45 degrees, up to about 90 degrees, around the perimeter of cutting chamber 103. The curved surface of inlet 113 may be positioned at a constant radial gap to the tip 104a of mower blade 104, and the radial gap may be less than about 1 inch, and preferably less than about 10 mm. The inlet may be positioned under the horizontal deck surface 110 of the mower deck. A forward end 125 of the curved surface of the inlet may be under the deck at a position in front of cutting chamber 103. The forward end of the curved surface also may be in front of and to the left of the side discharge opening, when viewed from above.

Figure 5:
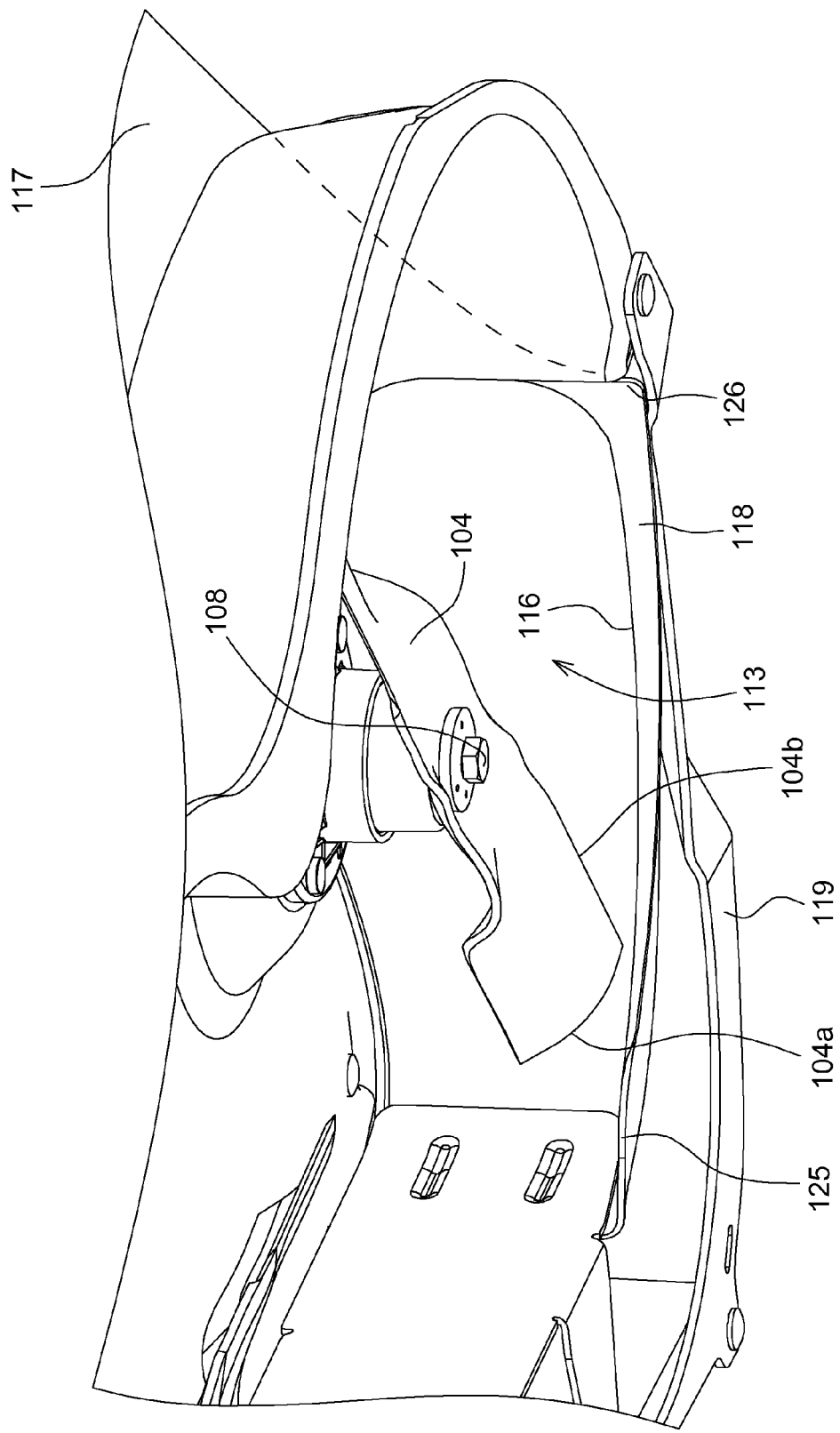
FIG. 5 is a perspective view of the underside of a grass collector chute with a mower blade near a forward end of the inlet according to a first embodiment of the invention.
Figure 6:
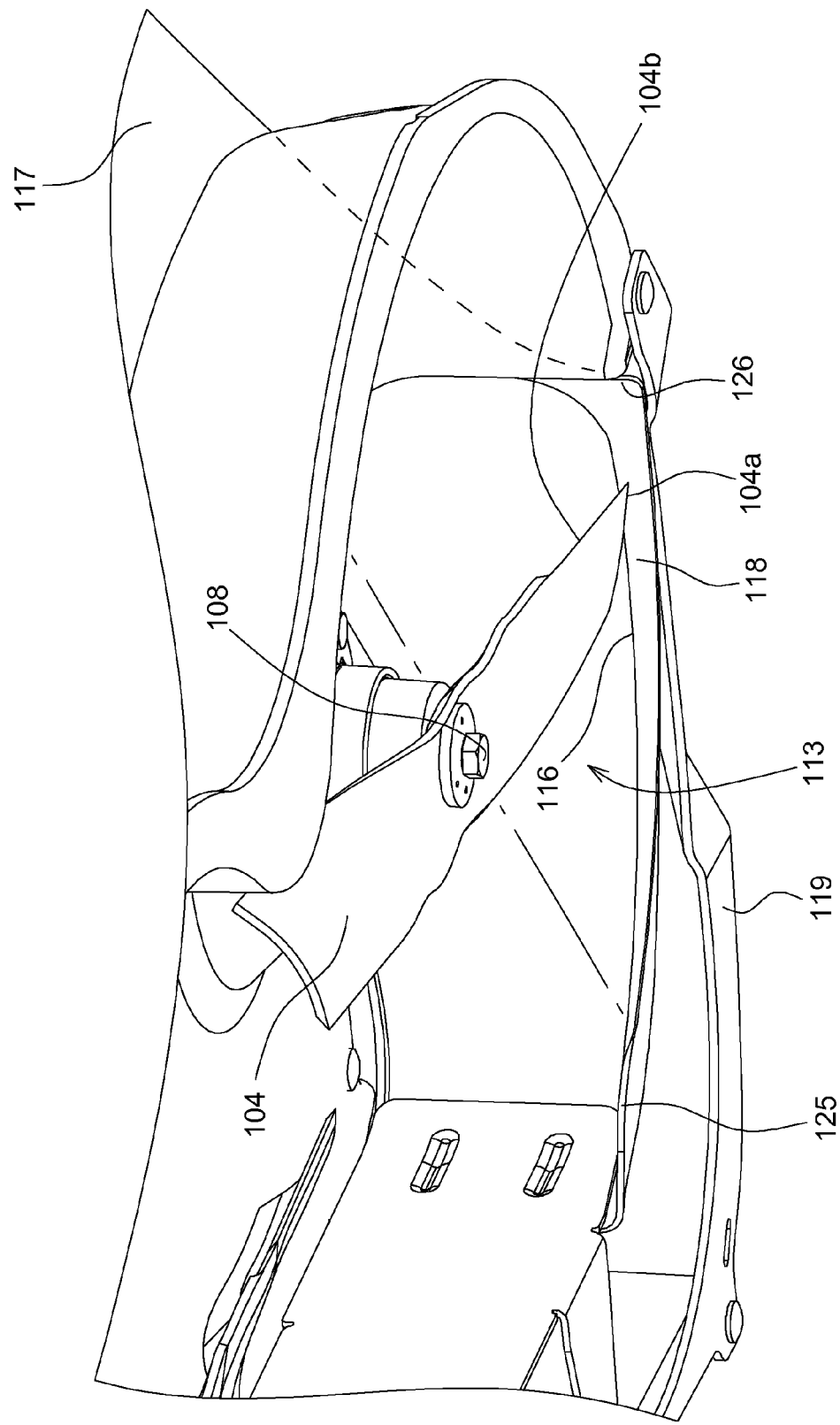
FIG. 6 is a perspective view of the underside of a grass collector chute with a mower blade near a rearward end of the inlet according to a first embodiment of the invention.

In one embodiment, the grass collector chute may have an inlet with a bottom surface 116, vertical surface 118 adjoining the inside of the bottom surface, and wall surface 127 adjoining the outside of the bottom surface. The bottom surface, vertical surface and wall surface may be arced or curved surfaces positioned near the tip 104a of rotary mower blade 104. The bottom surface and vertical surface are less than about 1 inch radially outside the blade tip, and preferably less than about 10 mm. Bottom surface 116 may provide a shelf or ledge that slopes upwardly in the direction of rotation of cutting blade 104, from forward end 125 of inlet 113 to rearward end 126 of inlet 113. For example, the bottom surface may slope upwardly from forward end 125 below the height of the cutting edge 104b of the blade as shown in FIG. 5, to rearward end 126 slightly above the height of the blade's cutting edge 104b as shown in FIG. 6. Vertical surface 118 may be perpendicular to the bottom surface and may increase in height from the forward end to the rearward end of inlet 113, in the direction of blade rotation. The upward sloping bottom surface 116 and increasing height of vertical surface 118, from the forward end to the rearward end of inlet 113, promote flow of grass clippings from the mower deck into the grass collector chute, and reduce clogging of the chute.

In one embodiment, baffle 120 may be provided under the mower deck adjacent mower deck grass collector chute 112. Baffle 120 may be mounted to the underside of the horizontal deck surface between inlet 113 and skirt 111 in front of cutting chamber 101. Baffle 120 may provide a generally smooth and uninterrupted surface for the flow of grass clippings from cutting chamber 101 toward inlet 113.

Having described the preferred embodiment, it will become apparent that various modifications can be made without departing from the scope of the invention as defined in the accompanying claims.

The invention claimed is:

1. A mower deck grass collector chute, comprising:
an inlet connected to an outlet by a tubular portion; the inlet detachably mounted and covering a side discharge opening through a skirt of a multi-chamber mower deck and having a curved surface extending partially around a first generally circular cutting chamber under the mower deck in front of and to the right of a mower blade spindle and having a constant radial gap to a tip of a mower blade attached to the spindle.

2. The mower deck grass collector chute of claim 1 wherein the curved surface of the inlet slopes upwardly from a forward end to a rearward end.

3. The mower deck grass collector chute of claim 1 wherein the inlet of the chute comprises a bottom surface above an adjoining vertical surface and below an adjoining wall surface of the chute.

4. The mower deck grass collector chute of claim 1 further comprising a baffle mounted under the mower deck between the inlet and a front of a second cutting chamber.

5. The mower deck grass collector chute of claim 1 wherein the inlet is detachably mounted to a side discharge opening in the mower deck, the side discharge opening through a front and a right side of the first cutting chamber, and through a horizontal deck surface over the first cutting chamber.

6. A mower deck grass collector chute, comprising:
an inlet detachably mounted to cover a side discharge opening in a skirt of a mower deck, a tubular portion extending upwardly and rearwardly from the inlet to an outlet;
the inlet positioned under a horizontal deck surface of the mower deck and having a curved surface extending forwardly under the mower deck at least about 45 degrees around the perimeter of a first cutting chamber and having a constant radial gap between the curved surface and a tip of a mower blade in the first cutting chamber; a forward end of the curved surface being in front of the first cutting chamber.

7. The mower deck grass collector chute of claim 6 wherein the curved surface slopes up from the forward end to a rearward end.

8. The mower deck grass collector chute of claim 6 wherein the side discharge opening is forwardly and to the right of a mower blade spindle in the first cutting chamber.

9. The mower deck grass collector chute of claim 6 wherein the forward end of the curved surface is forwardly and to the left of the side discharge opening.

10. A mower deck grass collector chute, comprising:
a one-piece plastic tubular member detachably mounted to cover a side discharge opening through the skirt of a multi-chamber mower deck and extending under the mower deck in front of a first cutting chamber; the one-piece plastic tubular member having an inlet with an upwardly sloping curved surface extending partially around a perimeter of the first cutting chamber with a constant radial gap between the upwardly sloping curved surface and a tip of a cutting blade in the cutting chamber.

11. The mower deck grass collector chute of claim 10 wherein the upwardly sloping curved surface extends at least about 45 degrees around the perimeter of the first cutting chamber.

12. The mower deck grass collector chute of claim 10 wherein the upwardly sloping curved surface includes a bottom surface and an adjoining vertical surface.

13. The mower deck grass collector chute of claim 10 wherein the inlet of the one-piece plastic tubular member extends under the mower deck forwardly and to the left of the side discharge opening.

14. The mower deck grass collector chute of claim 10 wherein the side discharge opening is through a horizontal deck surface above the first cutting chamber.

15. The mower deck grass collector chute of claim 10 wherein the upwardly sloping curved surface has a forward end below the cutting blade and a rearward end above the cutting blade.

* * * * *